United States Patent

(12) United States Patent
Fasold et al.

(10) Patent No.: US 10,122,031 B2
(45) Date of Patent: Nov. 6, 2018

(54) HUMIDIFIER, IN PARTICULAR FOR A FUEL CELL

(71) Applicant: MANN+HUMMEL GMBH, Ludwigsburg (DE)

(72) Inventors: Michael Fasold, Auenwald (DE); Bernd Tippmer, Ludwigsburg (DE); Michael Harenbrock, Ludwigsburg (DE); Heinz Fuchs, Benningen (DE); Sascha Bauer, Auenwald (DE); Joerg Menssen, Markgroeningen (DE); Thomas Tschech, Marbach (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 593 days.

(21) Appl. No.: 14/749,277

(22) Filed: Jun. 24, 2015

(65) Prior Publication Data

US 2015/0380749 A1 Dec. 31, 2015

(30) Foreign Application Priority Data

Jun. 27, 2014 (DE) .................... 10 2014 009 325

(51) Int. Cl.
H01M 8/04 (2016.01)
B01D 63/08 (2006.01)
H01M 8/04119 (2016.01)

(52) U.S. Cl.
CPC ...... *H01M 8/04149* (2013.01); *B01D 63/082* (2013.01); *B01D 2313/025* (2013.01); *B01D 2313/20* (2013.01)

(58) Field of Classification Search
CPC ......... H01M 8/04149; B01D 2313/025; B01D 2313/20; B01D 63/082
See application file for complete search history.

(56) References Cited

U.S. PATENT DOCUMENTS

2010/0019400 A1* 1/2010 Robb ................ H01M 8/04126
261/101
2015/0171442 A1 6/2015 Fasold et al.
2015/0171445 A1 6/2015 Fasold et al.

* cited by examiner

*Primary Examiner* — Barbara L Gilliam
*Assistant Examiner* — Adam A Arciero
(74) *Attorney, Agent, or Firm* — James Hasselbeck

(57) ABSTRACT

A humidifier has a stack unit having a plurality of water-vapor-permeable membranes which are arranged parallel one above the other and spaced apart from one another. The membranes are enclosed at the edges at least in sections by an enclosing part, wherein the enclosing parts of membranes lying one above the other are directly connected to one another in a flow-tight manner.

14 Claims, 3 Drawing Sheets

HUMIDIFIER, IN PARTICULAR FOR A FUEL CELL

TECHNICAL FIELD

The invention relates to a humidifier which may be applied for humidifying air for a fuel cell.

BACKGROUND

Known from DE 10 2009 034 095 A1 is a humidifier for a fuel cell which comprises a membrane stack including a plurality of membranes which are arranged one above the other and spaced apart from one another and between which flow channels are arranged. The membranes are designed to be water-vapor-permeable and enable water molecules to pass over from moist air, which is guided between two membranes, to a flow of dry air in a flow channel between adjacent membranes, which thereby is enriched with moisture. The moistened airflow is fed to a fuel cell system in which electricity is generated as a result of an electrochemical reaction.

In the stack, the membranes are connected in their edge regions to frame parts, wherein a sealing element for flow-tight closure is arranged between the frame parts of adjacent membranes. The dry or moist air flows crosswise through flow channels which are arranged one above the other and between which in each case one membrane is placed. The frame parts and the sealing elements therebetween also serve as spacers through which the membranes clamped in parallel are kept spaced apart from one another.

SUMMARY OF THE INVENTION

It is an object of the invention to provide a humidifier of a structurally simple design, which is used for a fuel cell, for example.

By means of the humidifier according to the invention, the flowing air which, for example, is fed to a fuel cell for the electrochemical reaction, can be enriched with moisture until a required minimum moisture content in the air flow is reached. The humidifier has a stack of preferably parallel membranes which are spaced apart from one another and are in each case permeable to water vapor, but not to air, so that exclusively a water exchange from an air flow having a high moisture level to the air flow having a lower moisture level takes place, wherein the latter is fed to the fuel cell. The stack unit comprises at least two water-permeable or water-vapor-permeable membranes, but preferably more than two membranes, optionally several dozens of parallel membranes that are spaced apart from one another. Between in each case two membranes, a flow path or channel is formed through which an airflow is guided parallel to the membrane plane and through the stack unit.

The membranes are enclosed at the edge, at least in sections, by a frame part or enclosing part, wherein the enclosing parts of membranes placed one above the other are directly connected to one another in a flow-tight manner. The enclosing parts therefore assume multiple functions: the membranes are stabilized and held in their edge region by the enclosing parts and, moreover, membranes placed one above the other in the stack unit are connected to one another via the enclosing parts. Furthermore, the enclosing parts serve for sealing the lateral region of the flow path or flow channel between two membranes arranged in parallel. A sealing element for sealing the flow channel can be omitted in this area. Rather, the task of the sealing element is additionally undertaken by the directly adjoining enclosing parts, which are connected to one another in a flow-tight manner. This allows a structurally simple design with a reduced number of parts without limiting functionality.

The enclosing part can comprise, for example, two foils which enclose the membranes in the lateral region and are connected to one another by laminating, for example. The two foils enclose between them the lateral region of the membranes and together form a laminated flat membrane, wherein adjacent flat membranes are connected to one another in a flow-tight manner and without sealing element therebetween.

A support grid or screen grid can be welded between a foil and the membrane, at least on one side. The support grid advantageously covers at least 30% of the membrane area.

Optionally, a foil can have a waffle profile, for example with a pyramid structure, at least on one side, wherein the waffle profile extends over the region in which the foils overlap with the membrane so that at least mechanical anchoring or interlocking between the foil material and the membrane is achieved in the case of membrane materials that cannot be welded together.

By using an additional grid on the side opposite the waffle profile, which grid preferably has the same dimensions as the membrane, the additional grid can be welded to one of the foils during the welding process. Furthermore, additional mechanical fixation in the membrane is achieved by the grid or the webs of the grid.

According to another advantageous embodiment, the enclosing part has a profile section in its region situated laterally outside of the membrane, which profile section is spaced apart from the membrane plane and serves for connecting adjacent membranes. The profile section makes it possible to bridge the spacing between adjacent membranes so that an integral design of the enclosing part with enclosure of the lateral membrane region and with a connection section is possible. The profile section is formed to be angular or cranked, for example, and can have a contact region that is offset parallel to the membrane plane, wherein the contact regions of adjacent membranes adjoin one another directly and are connected to one another. The parallel sections result in a relatively large contact region which facilitates a flow-tight connection.

The enclosing part in the lateral region of the membrane is configured circumferentially and therefore forms a circumferentially enclosing frame. According to an alternative embodiment, the individual enclosing parts are provided on one or a plurality of side edges of the membrane, in particular on two opposing side edges, whereas the side edges which are offset by 90° can be free from enclosing parts; inflow and/or outflow takes place at these side edges. However, each of them can be configured as separate parts, even in the case that enclosing parts are arranged at all side edges.

The flow through the stack unit with the membranes accommodated therein advantageously takes place from flow chamber to flow chamber in each case between adjacent membranes lying on top of one another alternating at an angle of 90°, thus crosswise from flow chamber to flow chamber. This enables an inflow of moist air into a front end of the stack unit, wherein every second flow chamber on this front end and on the diametrically opposing front end is formed to be open, whereas the respective other flow chambers on these front ends are closed in a flow-tight manner. On the front end offset by 90°, the inflow of dry air into the stack unit takes place through the respective other flow chambers, which are formed to be open or closed in an alternately offset manner. In the region of open flow chambers, the enclosing parts are not connected to one another in a flow-tight manner, but leave an inflow or outflow opening open. According to an advantageous embodiment, no enclosing parts are arranged on the open front ends.

In order to connect adjacent enclosing parts, they can be welded together, for example. Ultrasonic welding or friction welding can be considered as welding methods.

According to another advantageous embodiment, spacers are inserted between directly adjacent membranes, which spacers keep the membranes spaced apart from one another and therefore ensure a sufficiently large flow chamber or flow path or flow channel between the membranes. It can be helpful to provide spacers between all adjacent membranes. However, according to an alternative embodiment, such spacers are only inserted in every second space between adjacent membranes, preferably in the intermediate space in which the air passing through has low pressure. This can be the case on the exhaust air side of the fuel cell, for example. The spacers have a supporting effect so that the channel is not blocked.

The spacers can form a continuous spacer grid. Furthermore, the spacers can have a flow-guiding function in order to guide the flow in the channel, in which the spacers are arranged, in a target-oriented manner from the inflow side to the outflow side in the channel. For example, it is possible to arrange the inflow and outflow sides offset to one another in the channel and to additionally guide the flow from the inflow side to the outflow side by means of the spacers.

BRIEF DESCRIPTION OF THE DRAWINGS

Further advantages and expedient embodiments can be found in the further claims, the description of the figures and the drawings. In the figures:

DESCRIPTION OF PREFERRED EMBODIMENTS

Figure 1:
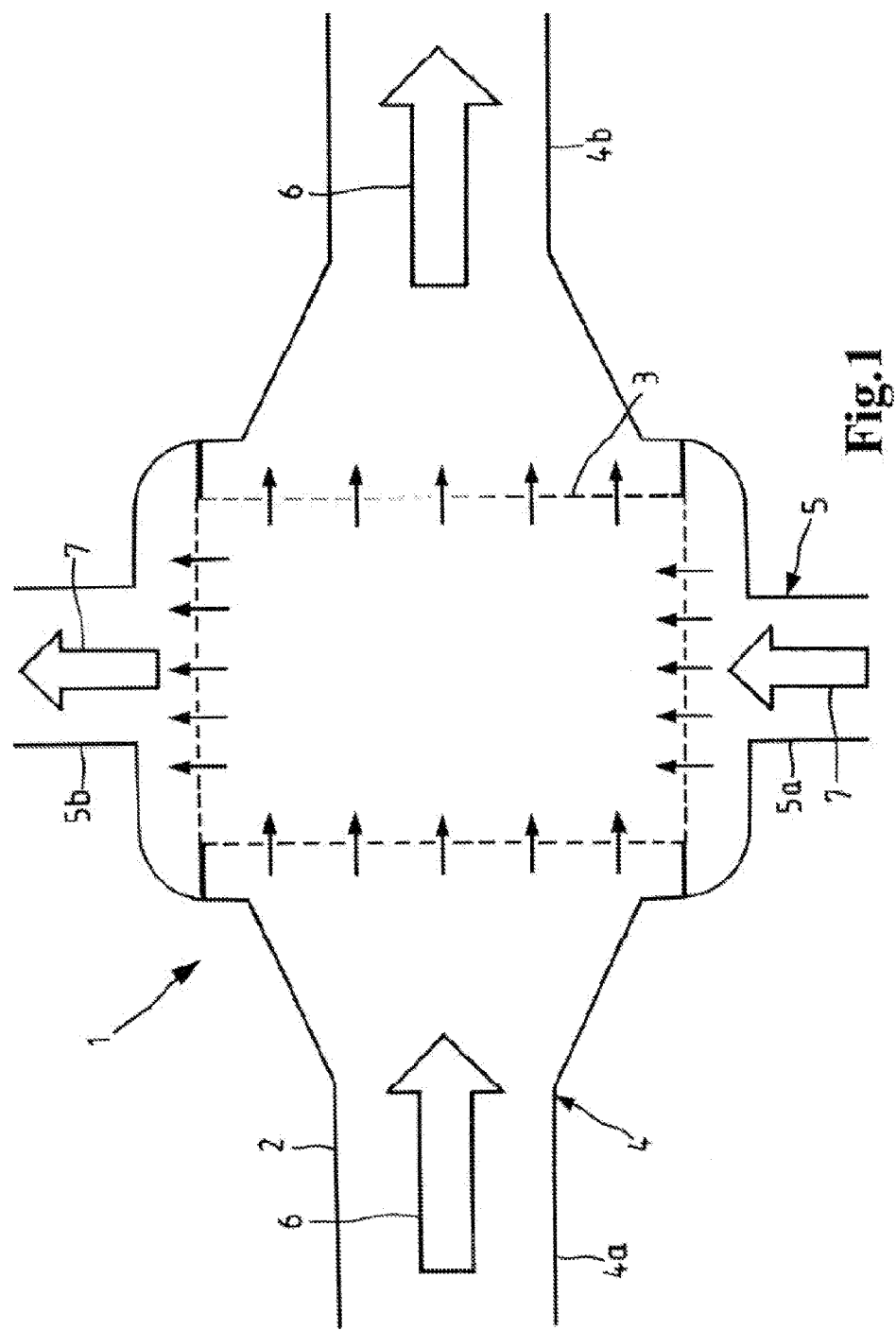
FIG. 1 shows a humidifier for a fuel cell having a cartridge inserted into a housing, the cartridge containing a plurality of water-vapor-permeable membranes which are arranged parallel one above the other and form a stack unit.

In FIG. 1, a humidifier 1 for a fuel cell is illustrated, via which fresh air enriched with moisture and having a minimum moisture level is fed to the fuel cell. In a housing 2, the humidifier 1 has a cartridge 3 which is inserted into the housing in a replaceable or fixed manner, and which serves for transmitting the moisture contained in an exhaust gas flow to a dry fresh air flow, which is fed to the fuel cell. The cartridge 3 has a stack unit comprising a plurality of water-vapor-permeable membranes stacked one above the other.

The housing 2 of the humidifier 1 is provided with a fresh air channel 4 via which ambient air is supplied as fresh air. The fresh air channel 4 comprises a feeding section 4a upstream of the cartridge 3 and a discharging section 4b downstream of the cartridge.

The housing 2 is provided with an exhaust gas channel 5 which is offset at an angle of 90° relative to the fresh air channel 4 and via which exhaust gases of the fuel cell, which are enriched with moisture, are guided through the cartridge. The exhaust gas channel 5 has a feeding section 5a upstream of the cartridge 3 and a discharging section 5b downstream of the cartridge.

The fresh air flow 6 and the exhaust gas flow 7 intersect according to the orientation of the channels 4 and 5 at an angle of 90°; however, the air flows 6 and 7 within the cartridge 3 are separated by the water-vapor-permeable membranes, which only permit water exchange from the exhaust gas flow 7 laden with a high level of moisture to the dry fresh air flow 6.

Figure 2:
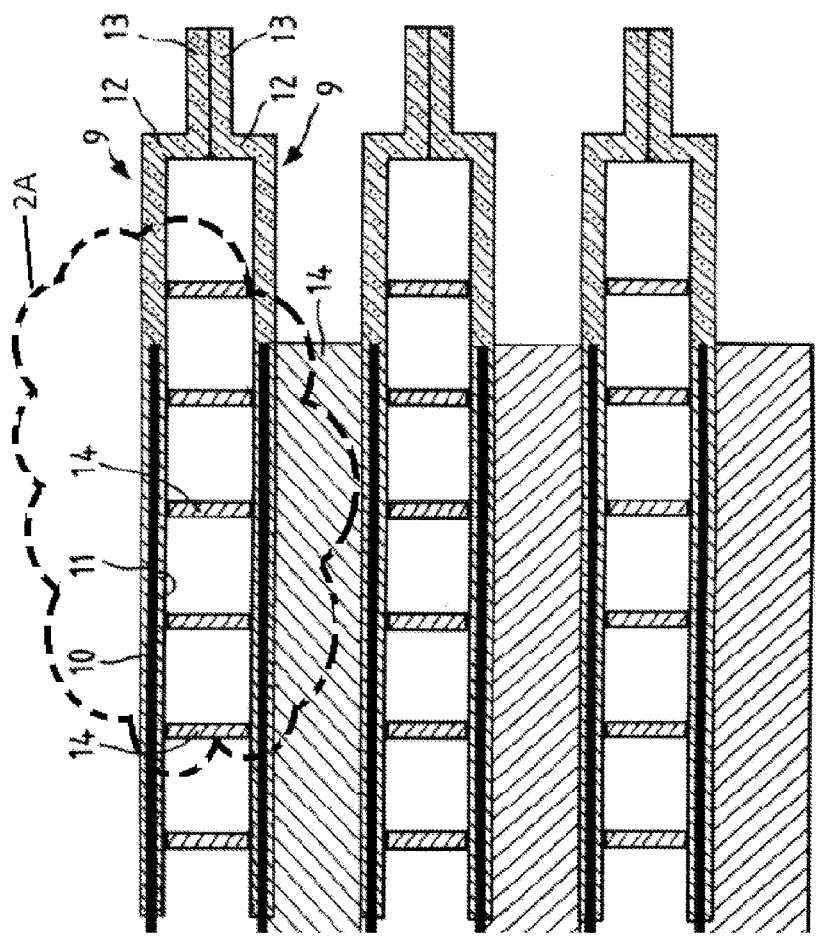
FIG. 2 shows a cross-section of a stack unit having membranes that are enclosed in the lateral region or edge region by enclosing parts which are connected to one another.

FIG. 2 shows a cartridge 3 in a cross-sectional view. The cartridge 3 comprises a stack unit having a plurality of parallel membranes 8 which are arranged one above the other and spaced apart from one another, each of which are water-vapor-permeable, but do not permit air to pass through. The flow chambers or channels for guiding the fresh air flow and the exhaust gas flow therethrough extend in each case between two membranes 8. The fresh air channels 4 and the exhaust gas channels 5 alternate between the membranes 8 in the direction as they are arranged one above the other.

Each membrane 8 is enclosed in its edge region by an enclosing part 9 comprising two foils 10 and 11, which are connected to one another by laminating or welding. One foil 10 lies on one side of the edge region of the membrane 8 and the second foil 11 lies on the opposite side of the membrane 8. The edge regions of the membranes 8 are fixedly connected to the enclosing part 9 formed by the foils 10 and 11 by means of the laminating or welding process. Optionally, only one foil laid around the edge region of the membrane 8, instead of two foils 10 and 11, is used for the enclosing part 9.

Figure 2A:
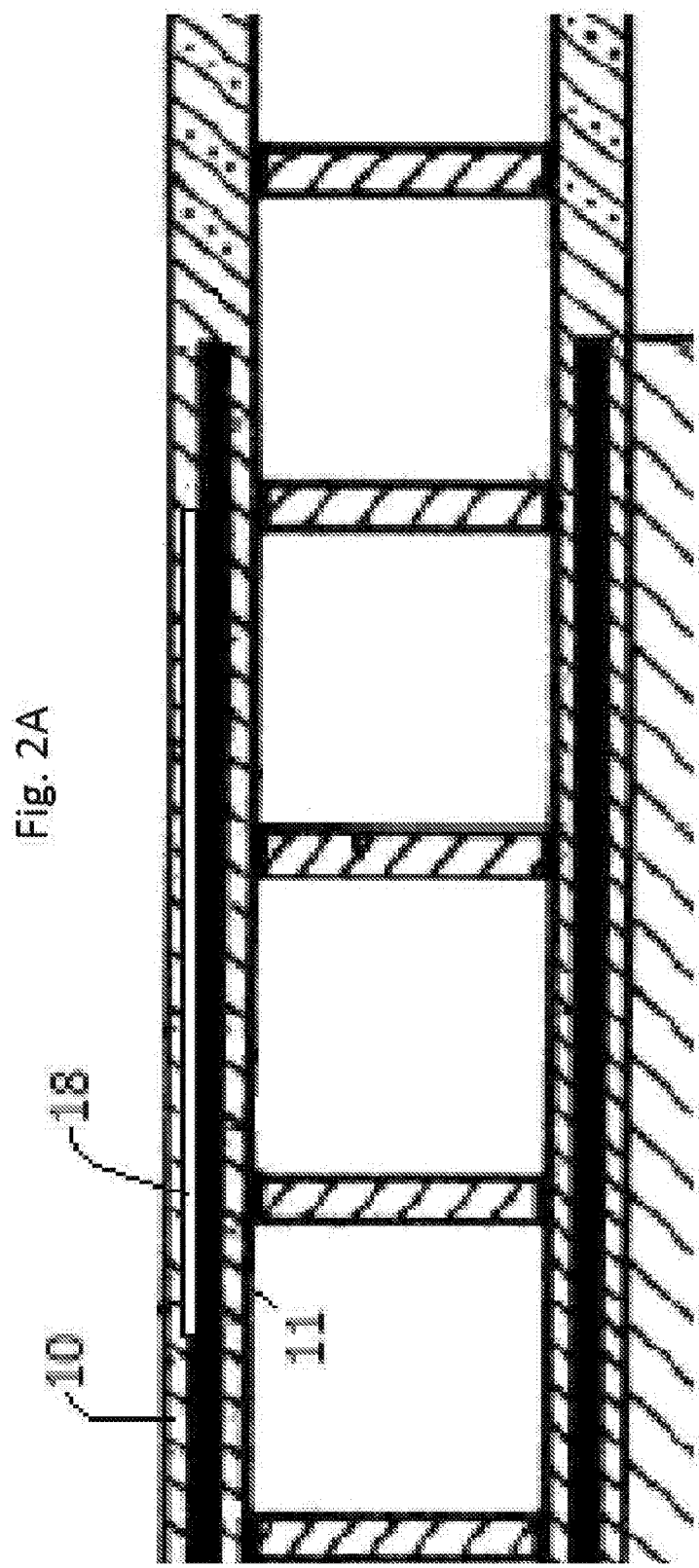
FIG. 2A shows an enlarged view of the dashed cloud region "2A" in FIG. 2, In the figures, the same components are designated by the same reference signs.

Laterally outside of the membrane 8, the enclosing parts 9 form a profile section 12 which is formed to be angular or beveled or optionally cranked or curved and has a contact region 13 that extends parallel and offset to the plane of the membrane 8. The contact regions 13 of adjacent enclosing parts 9 contact one another other and are connected to one another in a flow-tight manner. The contact regions 13 rest directly against one another; a sealing element or any other component therebetween is not required. Each of the contact regions 13 is formed to be flat and extends with parallel spacing to the membrane plane so that, on the one hand, the spacing between adjacent membranes 8 is bridged via the profile section 12 and, on the other, the contact regions 13 arranged on top of one another rest against one another with a comparatively large surface area, which supports a flow-tight connection. The connection is implemented by welding, for example. In FIG. 2A, and enlarged view of the region "2A" of FIG. 2 is shown. FIG. 2A shows a support grid or screen grid 18 fixedly welded between a foil 10 or 11 and the membrane 8, at least on one side of the membrane 8.

Since the fresh air channels 4 and the exhaust gas channels 5 extend offset to one another at an angle of 90°, the edge regions of the membranes 8 are accordingly also provided with enclosing parts 9 which are offset at an angle of 90° and which seal the corresponding front ends at the channels. Enclosing parts are also located at the front ends of a channel, each of which front ends is offset by 90°; the foils 10 and 11 are also connected to one another at the front ends, e.g. by welding or adhesive bonding. Here, the bonded foils 10 and 11 together with a sealing strip, e.g. a plastic component or an adhesive tape, form the second axially offset channel.

In the spaces between the membranes 8, which form the fresh air channels 4 and the exhaust gas channels 5, spacers 14 are inserted which extend directly between the membranes 8 and keep the membranes at a defined distance from one another.

What is claimed is:

1. A humidified capable of humidifying air for a fuel cell, comprising:
    at least one stack unit including a plurality of membranes permeable to water vapor in which each membrane is arranged one above the other and spaced apart from one another;
    a plurality of enclosing parts, each enclosing part secured onto a membrane edge of a respective one of the plurality of membranes, each enclosing part having:
        a flat contacting region arranged laterally outwardly from the membrane edge;
        a profile section connected to the contacting region and arranged perpendicularly between the membrane edge and the contacting region;
        a first foil connected to the profile section, the first foil resting directly on and extending on and fixedly connected to a first side of the respective one of the plurality of membranes; and
        a second foil connected to the profile section and resting directly on and extending on and fixedly connected to an opposite second side of the respective one of the plurality of membranes, such that the membrane edge is sandwiched between the first and second foil;
    wherein the membrane edge is enclosed at least in sections, by the foils of the enclosing part; and
    wherein the membrane edge of a first membrane of the plurality of membranes is fixedly connected to a first enclosing part of the plurality of enclosing parts;
    wherein the membrane edge of an immediately adjacent second membrane of the plurality of membranes is fixedly connected to a second enclosing part of the plurality of enclosing parts;
    wherein a connecting region of the first connecting part is fixedly directly connected onto the connecting region of the second connecting part, forming a flow-tight connection;
    wherein the connecting regions of the first connecting part and the second connecting part are arranged between membrane planes of the first membrane and the second membrane.

2. The humidifier according to claim 1, further comprising a support grid fixedly connected to and arranged between the membrane and the foil, at least on one side of the membrane.

3. The humidifier according to claim 2, wherein the support grid covers at least 30 percent of a membrane surface area of the membrane.

4. The humidifier according to claim 1, wherein the profile section is formed to be angular.

5. The humidifier according to claim 1, wherein a first angular section of the profile section extends in a direction traverse to the membrane plane;
    wherein a second angular section of the profile section extends in a direction parallel to the membrane plane and offset from the membrane plane.

6. The humidifier according to claim 1, wherein the enclosing part encloses the membrane circumferentially.

7. The humidifier according to claim 1, wherein the enclosing parts of adjacent membranes are connected to one another at two opposing side edges.

8. The humidifier according to claim 7, wherein at flow channels offset in a parallel manner, the enclosing parts are connected to sealing strips at the front ends which are offset by 90 degrees.

9. The humidifier according to claim 1, wherein the enclosing parts of adjacent membranes are securely connected to one;
    wherein the secure connection is a welded connection.

10. The humidifier according to claim 1, further comprising
    spacers arranged between two adjacent membranes of the plurality of membranes.

11. The humidifier according to claim 10, wherein adjacent membranes of the plurality of membranes are separated by a space therebetween;
    wherein the spacers are only provided and arranged between every second space between adjacent membranes.

12. The humidifier according to claim 10, wherein the spacers form a spacer grid.

13. The humidifier according to claim 11, wherein space between adjacent membranes form flow channels;
    wherein the spacers are formed in a flow-guiding manner and guide the flow in the flow channels in which the spacers are arranged, from an inflow side to an outflow side in the flow channel.

14. A fuel cell comprising a humidifier according to claim 1.

* * * * *